United States Patent [19]

Cook

[11] Patent Number: 5,442,542
[45] Date of Patent: Aug. 15, 1995

[54] MACHINE STATE VIRTUALIZER

[76] Inventor: Steven R. Cook, 2575 S. Bayshore Dr., Suite 8A, Coconut Grove, Fla. 33133

[21] Appl. No.: 700,705

[22] Filed: May 16, 1991

[51] Int. Cl.[6] .......................................... G05B 19/02
[52] U.S. Cl. ............................ 364/140; 364/709.01; 364/709.11
[58] Field of Search ................. 364/140–147, 364/191, 709.14, 709.15, 709.11, 709.09, 709.12, 709.13, 709.16, 709.01; 370/60

[56] References Cited

U.S. PATENT DOCUMENTS

| | | | |
|---|---|---|---|
| 4,570,216 | 2/1986 | Chan | 364/143 |
| 4,672,602 | 6/1987 | Hargrave et al. | 370/58 |
| 4,679,135 | 7/1987 | Kobayashi et al. | 364/146 |
| 4,757,463 | 7/1988 | Ballou et al. | 395/905 |
| 5,144,548 | 9/1992 | Salandro | 364/191 |
| 5,179,552 | 1/1993 | Chao | 370/60 |
| 5,249,115 | 9/1993 | Reid | 364/141 |

OTHER PUBLICATIONS

Datametrics, Inc., "Communications Manager" brochure, 1989.
Electronic Equipment Bank, *1990 EEB Shortwave Catalog, pp. 10–11, 1990*.
Keithley, *MCPT-8X8 Metrabus Crosspoint Matrix Relay Boards*, "Data Acquisition Land Control" Catalogue, vol. 24, p. 238, 1991.
Harris Semiconductor/RCA Solid State, "CD54/74HC22106, CD54/74HT22106" brochure, Jul. 1985.
*National Semiconductor, CMOS Logic Databook*, pp. 5–56, 1988.
Omega Engineering, Inc., "AT-DIO-32F" The Data Acquisition and Control Handbook Catalogue, pp. D-62-D-64, 1990.
Micromint, BCC180 brochure, "Catalog of Embedded Controllers", pp. 16–17, 1991.
"Crosspoint Switches Seek Bandwidth", *EDN*, Mar. 21, 1991, p. 3.
Morgan, Don, "Understanding the GPIB", *Dr. Dobb's Journal*, pp. 48, 50, 52–53, and 92, Apr., 1991.
Liebson, Steve, *The Handbook of Microcomputer Interfacing*, 2nd Edition, pp. 144–179.
Tandy Corporation, *Realistic Service Manual, PRO-2006 Programmable Scanner*, Catalogue No.: 20-145/9145, pp. 5, 17, and 77–78, 1990.

*Primary Examiner*—Roy N. Envall, Jr.
*Assistant Examiner*—Thomas E. Brown
*Attorney, Agent, or Firm*—Evenson, McKeown, Edwards & Lenahan

[57] ABSTRACT

A machine state virtualizer is an apparatus for controlling an electronic device having a switch matrix of X-lines and Y-lines (sometimes referred to as crosspoint switches) with a microcomputer. The device includes a plurality of switches which interconnect specified X-lines and Y-lines of the electrical device. A microcomputer references a machine state virtualization map and outputs data corresponding to a desired machine state. The output data is then decoded and used to control the plurality of switches so as to virtualize the desired machine state of the electronic device. The microcomputer utilizes sequences and rules for implementing a defined device control objective.

3 Claims, 6 Drawing Sheets

FIG 3

| CN1 Pin | Data Value | 1 | 2 | 3 | 4 | 5 | 6 | 7 | 8 | 9 | 0 | . | Man Pri | Limi L/o | Scan Spee Up | Pgm Rst | Dela Mod Dow Ent | Mon L/O Step Dire Clea |
|---|---|---|---|---|---|---|---|---|---|---|---|---|---|---|---|---|---|---|
| 1 | 0 |  |  | x |  |  | x |  |  |  |  |  |  |  |  |  |  |  |
| 2 | 1 |  | x |  |  | x |  |  | x | x |  |  |  |  |  |  |  |  |
| 3 | 2 | x |  |  | x |  |  | x |  |  | x |  |  |  |  |  |  |  |
| 4 | 3 |  |  |  |  |  |  |  |  |  |  |  |  |  |  | x | x |  |
| 5 | 4 |  |  |  |  |  |  |  |  |  |  |  | x |  |  |  |  |  |
| 6 | 5 |  |  |  |  |  |  |  |  |  |  |  |  |  | x |  |  |  |
| 7 | 6 |  |  |  |  |  |  |  |  |  |  |  | x |  |  |  | x |  |
| 8 | 7 |  |  |  |  |  |  |  |  |  |  |  |  | x |  |  |  | x |
| 9 | 0 | x | x |  |  |  | x |  | x | x |  |  | x |  |  |  |  |  |
| 10 | 8 |  |  |  | x | x | x |  |  |  |  |  |  |  | x | x |  |  |
| 11 | 16 |  |  |  |  |  |  |  |  |  |  |  |  |  |  |  | x | x |
| 12 | 24 |  |  |  |  |  |  |  |  |  | x | x |  | x | x | x | x | x |
| 13 |  |  |  |  |  |  |  |  |  |  |  |  |  |  |  |  |  |  |

| Bit 1-5 value | 2 | 1 | 0 | 10 | 9 | 8 | 7 | 6 | 5 | 4 | 15 | 14 | 13 | 12 | 11 | 23 | 22 | 21 | 20 | 19 | 31 | 30 | 29 | 28 | 27 |
|---|---|---|---|---|---|---|---|---|---|---|---|---|---|---|---|---|---|---|---|---|---|---|---|---|---|

MACHINE STATE VIRTUALIZER

BACKGROUND OF THE INVENTION

Device and process control in prior art electronics applications is generally achieved through special purpose circuitry using either simple gate logic or more complex microprocessor controllers. Such prior art devices typically are provided with switches to enable a user to manually initiate and control their various applications.

Generalized process control according to the prior art usually involves limited switching of electrical devices (e.g., a heater is turned on via a relay if temperature falls to a certain level). Such control strategies typically employ a device controller such as the 8255 programmable peripheral controller and the necessary hardware and software drivers. Thus, a logic state controls a semiconductor or mechanical relay which in turn switches a control voltage. Such a design is acceptable if the device to be controlled is engineered to respond to simple logic signals, or has simple control needs which can be accommodated through patterns of parallel data. However, such a control design is not acceptable for situations wherein control of large numbers of states is necessary, for control of analog applications, or for control of more complex switch strategies such as non-standard states and time-sensitive requirements.

In certain specialized fields there are standards and conventions governing the interaction among various devices engineered to conform to these standards. For example, IEEE 488 is a recognized standard for inter-device communication. Other examples of such standards are MIDI, which is used for control of musical instruments, and the proprietary CI-V standard published by ICOM America for the control of radio devices. Most devices which are part of such a configuration are generally also controllable through switches and similar means. Unfortunately, these existing standards and the associated control schemes require specialized engineering of the electrical device and adherence to rigorous pre-set standards.

Basic multiplexer techniques have been developed for applications such as the computer data/control bus, audio/video switching, and telephonic switching, however, such devices and the necessary software and processes have not been developed for general device and process control.

Because of the lack of a universal standard for device control, and because of the multiplicity of machine functions, intended users and disparate design strategies, a unifying approach for the control of electronic devices is unknown in the prior art.

SUMMARY OF THE INVENTION

The device of this invention overcomes the disadvantages of the prior art discussed above and allows a universal approach to device control by interaction with the device's own switches and existing control facilities, and by use of the device's own signal levels and timings. The control infrastructure of the device of this invention initiates and manages the controlled device, not through imposing external control events as in the prior art, but by virtualizing the very events for which the machine was designed.

The device of this invention is a generalized interface which implements state switching, electronic device control, and related applications using a microcomputer. Accordingly, the device of this invention has widespread applications and can be used to control any electrical device which uses switches or responds to logic states. However, one specific advantageous use of the device of this invention is the use thereof to control radio devices.

A typical electronic device incorporates an electronic keypad having an X-Y network of switches (sometimes referred to as a crosspoint switch network). The X-Y lines are interconnected by keystrokes, and data is generated thereby and forwarded to other blocks of the device through simple logic state switching, pulse coded switching and other strategies. Depending upon the device, the X-Y switch network may be used to input data to a microcontroller. The signals switched by the keypad may include non-standard states and/or timed pulses, thus rendering simple logical control unreliable. The device of this invention overcomes the unreliability by connecting directly to the X-Y circuits and, under microcomputer control, by virtualizing the keystrokes for which an electronic device was designed.

BRIEF DESCRIPTIONS OF THE DRAWINGS

FIG. 3 shows an exemplary keypad logic analysis map;

DETAILED DESCRIPTION

Figure 1A:
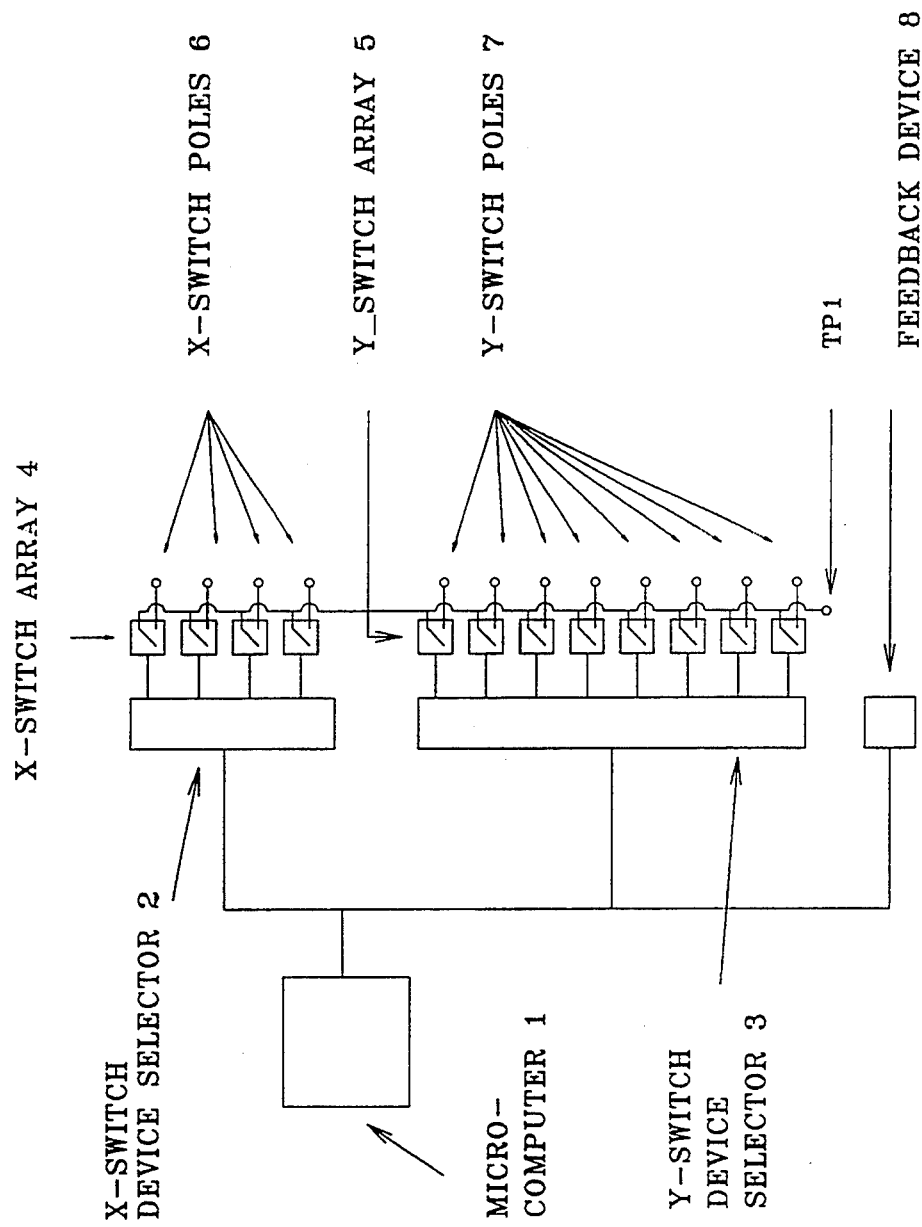
FIG. 1a is a block diagram of a first preferred embodiment of the invention.

According to the first preferred embodiment of the invention, four X-switch poles 6 and eight Y-switch poles 7 are hard-wired to the X-Y circuits of an electronic device to be controlled. As shown in FIG. 1a, an X-switch array 4 is provided to electronically switch each of the X-switch poles to a common line TP1. Similarly, a Y-switch array 5 is provided to electronically switch each of the Y-switch poles to the common line TP1. Electronic control of the X-switch array 4 and Y-switch array 5 is effected under the control of a microcomputer 1 through X-switch device selector 2 and Y-switch device selector 3, respectively. The microcomputer 1 provides control signals representative of machine states of the device to be controlled, and forwards these control signals to the device selectors. The device selectors then decode these control signals and control the individual switching of the switch arrays thereby. A feedback device 8 is provided which provides a feedback signal from the electronic device to the microcomputer 1.

Figure 1B:
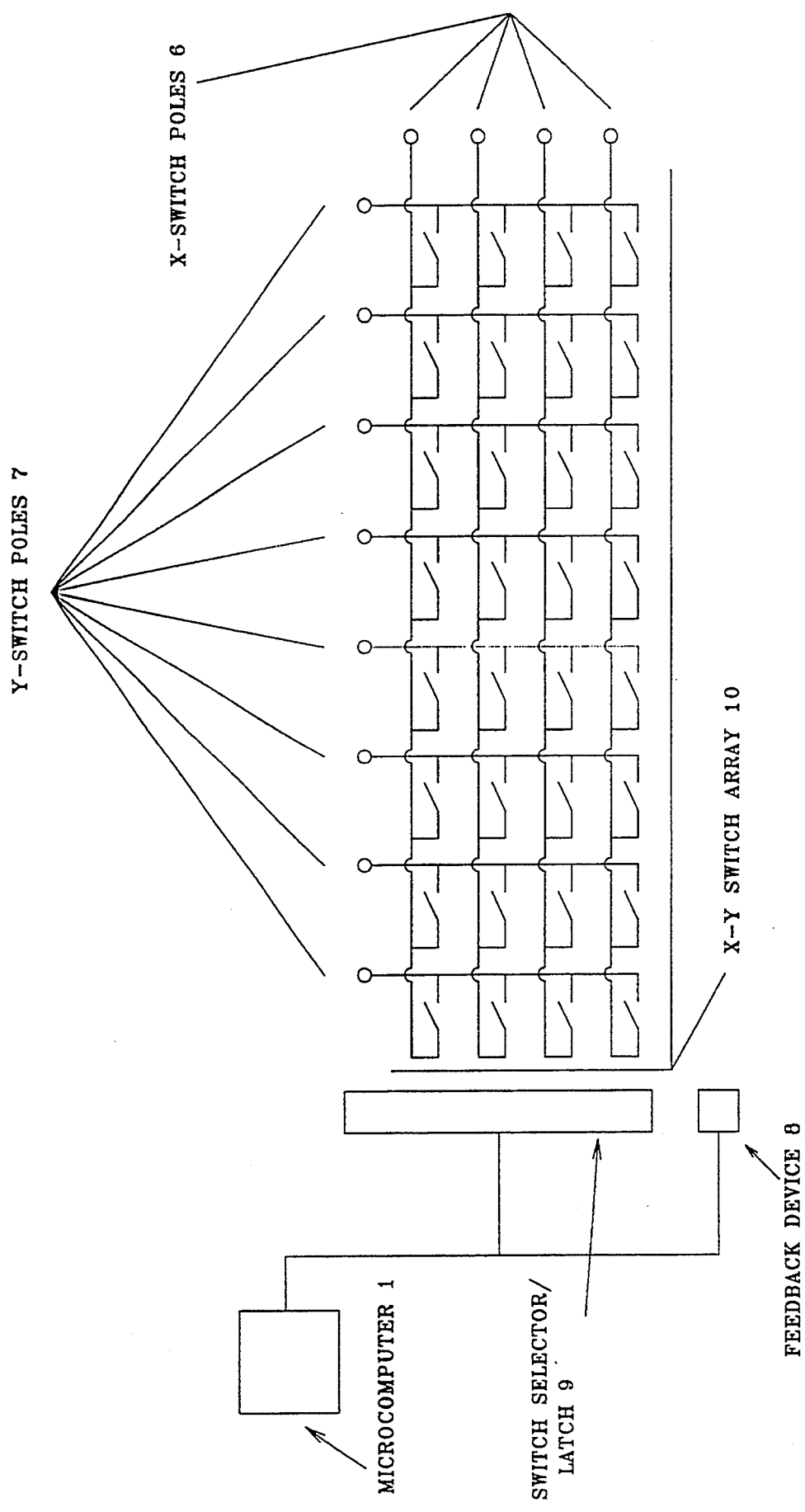
FIG. 1b is a block diagram of a second preferred embodiment of the invention.

A second preferred embodiment of the invention is shown in FIG. 1b, wherein corresponding elements from FIG. 1a are denoted by the same reference numerals. In the second preferred embodiment, the device selectors are replaced by a switch selector/latch 9 which controls a 32-unit electronic X-Y switch array 10. The X-Y switch array 10 implements a switch matrix of the eight Y-switch poles 7 and the four X-switch poles 6. Thus, electrical interconnection between any Y-switch pole and any X-switch pole may be achieved under control of the switch selector/latch 9. Feedback device 8 is also provided in the second preferred embodiment.

Figure 2:
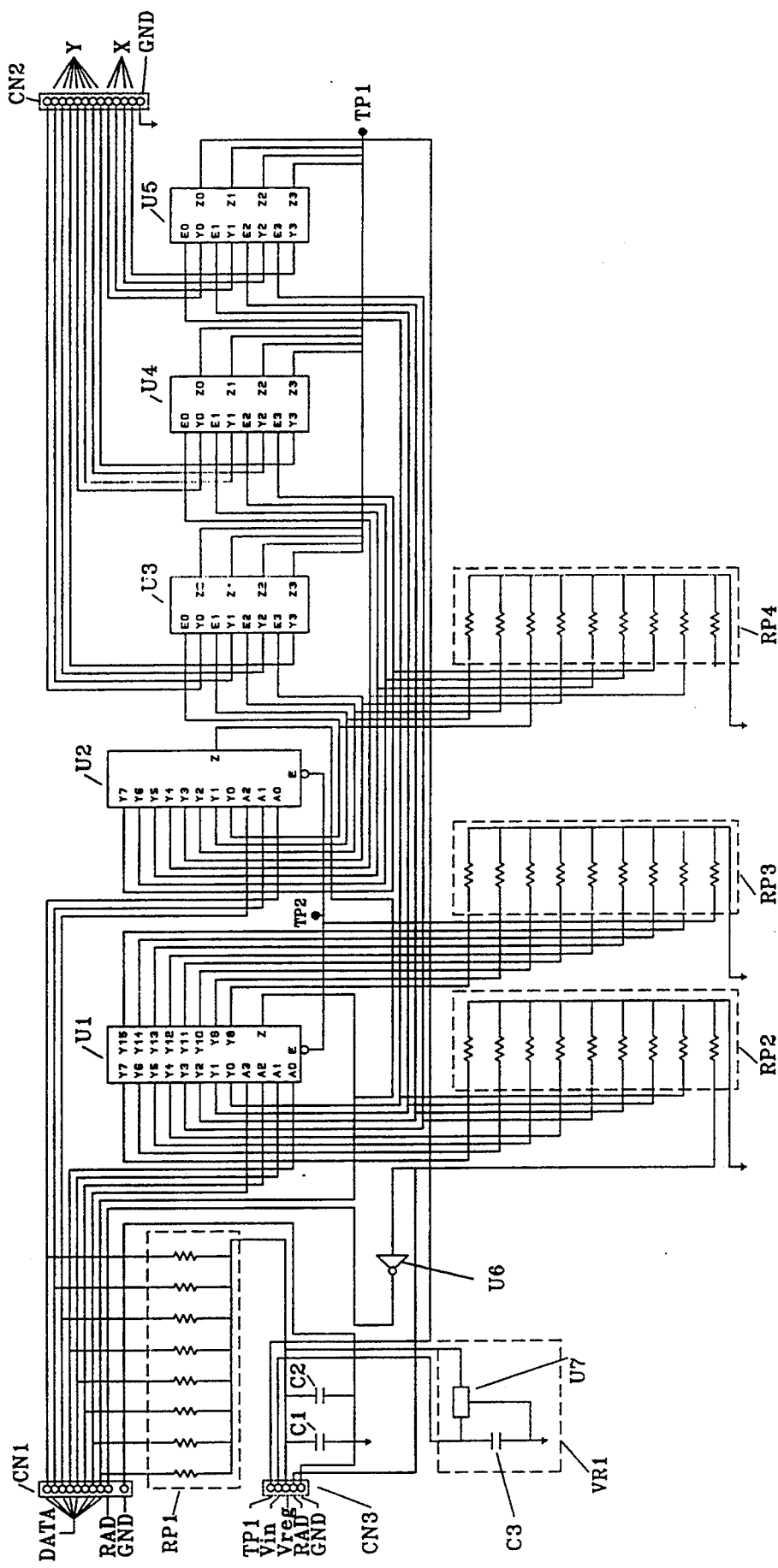
FIG. 2 is a schematic diagram of a specific implementation of the device of the invention according to the first preferred embodiment.

A more detailed schematic diagram of the first preferred embodiment of the invention is shown in FIG. 2, wherein the device is used to control a 4×8 X-Y switch network.

Exemplary component values are included in the discussion of this preferred embodiment. However, determination of these values in this or a similar circuit would be apparent to one skilled in the art.

CN1 is a connector which is attached, for instance, to a parallel port of an IBM PC compatible microcomputer. CN1 includes ten lines, seven of which are data lines, one of which is an input/output control, one of which is ground, and the last of which (RAD) reads a signal from another connector CN3, discussed below. A resistor pack RP1, preferably having a resistance of 2.2 kOhm, is provided to pull up the voltage on the data and I/O lines.

A second connector CN2 is provided through which the device is connected to the X-Y switch matrix of the device being controlled. In this embodiment, CN2 includes eight Y-signal lines, four X-signal lines, and a ground line.

The third connector CN3 provides power and access to other external signals. According to this embodiment, CN3 is provided with five lines: a TP1 line; a receiver activity detection (RAD) line; voltage in (Vin); voltage regulated (Vreg); and ground (GND). The TP1 line allows external access to or from the switch matrix, as will be discussed in more detail below. The receiver activity detection line allows the microcomputer to monitor receiver activity via a buffer U6 (preferably a 4049 hex inverting buffer) which captures a signal input from the receiver on this line.

Vin provides power to voltage regulator VR1. Voltage regulator VR1 comprises a 78LO5 voltage regulator U7 and a filter capacitor C3. The filter capacitor preferably has a value of 500 mf. The output of VR1 is connected to the Vreg line, and is used to power the rest of the circuit. A power supply filter capacitor C1 (preferably 10 mf) is connected in parallel between Vreg and ground to properly condition voltage. Voltage regulation could, of course, be provided externally, in which case Vin would be superfluous and a regulated voltage could simply be applied to Vreg. Capacitor C2 (preferably 0.1 mf) is connected between Vreg and ground to filter signal noise.

Four of the data lines from CN1 are fed to a data selector U1, which is preferably a 4067 integrated circuit. The four data lines are connected to terminals A0-A3 of the data selector U1, and are used to control the output of terminals Y0-Y3. Because only four X-signal lines are being controlled in this embodiment, only four of the Y terminals of U1 are being utilized. However, the four data lines are sufficient to control up to 16 outputs (Y0-Y15) of U1, if necessary.

Similarly, the remaining three data lines from CN1 are fed to terminals A0-A2 of data selector U2, which is preferably of the 4061 type. The three data inputs are used to control output of terminals Y0-Y7 of U2. An inhibit line TP2, connected to the inhibit pins of U1 and U2, is provided so that the data selectors may be inhibited if so desired via a manual switch or an electronic data selector.

The outputs Y0-Y3 of U1 are fed to switch poles E0-E3 of four bilateral switches incorporated in switch device U5. Similarly, the eight outputs Y0-Y7 of data distributor U2 are fed to terminals E0-E3 on each of two such switch devices U3, U4. Switch devices U3-U5 are preferably 4066 CMOS bilateral switches. Output lines Y0-Y3 and Y0-Y7, together with unused pins Y4-Y15 on U1, are held in a "default-low" state by resistor packs RP2-RP4 (preferably 100 kOhm). In other embodiments, such as higher energy applications, the apparatus of the invention could utilize alternative switch devices including solid state relays, other semiconductor switches, and mechanical relays.

Terminals Y0-Y3 of switch device U3, and terminals Y0-Y3 of switch device U4, are connected via CN2 to the Y-signal lines of the device to be controlled. Similarly, terminals Y0-Y3 of switch device U5 are connected via CN2 to the X-signal lines of the device to be controlled. Terminals Z0-Z3 of each of switch devices U3-U5 are connected to a common bus TP1. In addition to its bus function between the switch devices, TP1 can be used to send or receive a signal via the TP1 line in CN3 to or from one or more of the X-Y lines.

The 12 unused lines of data selector U1 may be used to virtualize a larger X-Y network. However, these lines may also be used for security purposes to serialize 4,096 possible combinations concealed under the IC for verification of proper connection and password protection. In this case, a diode should be inserted on the Z line of data distributor U1 to permit data to be written to both data selectors while restricting input to U1 and another 4049 buffer could be used to read the password information from U1.

The microcomputer 1 embodies a table which maps machine states of the controlled device to data values and controls switch timing and sequence. Mapping of the machine states allows the microcomputer to control the data lines such that a desired machine state is virtualized. According to the preferred embodiments, the microcomputer is programmed to execute control routines which require virtualization of a sequence of machine states, thus automating operation of the controlled device. For example, the microcomputer can be programmed to execute a radio scanning management routine such that a user may step through scanned channels automatically without using keystrokes normally necessary to operate the device directly. The microcomputer may also be programmed so that the channel is changed only when the receiver activity detection line indicates that the receiver is inactive. Clearly, an unlimited number of control routines applicable to all electronic devices with switches are available using the device of the invention.

The steps necessary to develop a machine state—data map will now be discussed with specific reference to the Radio Shack PRO2006 scanning radio, a consumer radio device not designed to facilitate external microcomputer control. First, the number of X and Y lines utilized by the device's front panel keypad are determined from examination of the device and/or documentation. Second, an interconnection strategy is developed to assign X-Y lines of the radio to the switch arrays of the Machine State Virtualizer. As in the preferred embodiments discussed above, all X lines are preferably connected to switches controlled by one data selector, while all Y lines are preferably connected to switches controlled by another data selector. Third, a data value is assigned to each data line according to the necessary circuitry. In the specific implementation of the first preferred embodiment discussed above, three data lines are used to control eight switches corresponding to the Y-signal lines, and four data lines are used to control four switches corresponding to the X-signal lines (leaving 12 outputs unused). The feedback device is connected to an available receiver circuit which indicates radio signal detect status and in turn makes such data available to the Machine State Virtualizer. Lastly, a map is developed which correlates X-Y switch intersections to data values.

The map is adjusted for any remaining data lines which may be needed for device selection or other functions. From this map, the microcomputer adds the data bits together to determine the byte necessary to virtualize a desired keystroke. In this way, the logic states of the computer are used to effect interconnection of switching circuits in the device rather than to apply the logic states of the computer directly to the device as in the prior art. FIG. 3 shows a keypad logic analysis map for the RS PRO2006 radio. An "X" is placed in the map corresponding to X-Y intersections of the relevant key. For this scanner, CN601 pins 1–8 are high when open and effect one low, variable duration pulse when closed. CN601 pins 9–12 are low open and high closed. A full discussion of the features and keypad logic of the PRO2006 scanner can be found in the PRO2006 service manual.

Figure 4A:
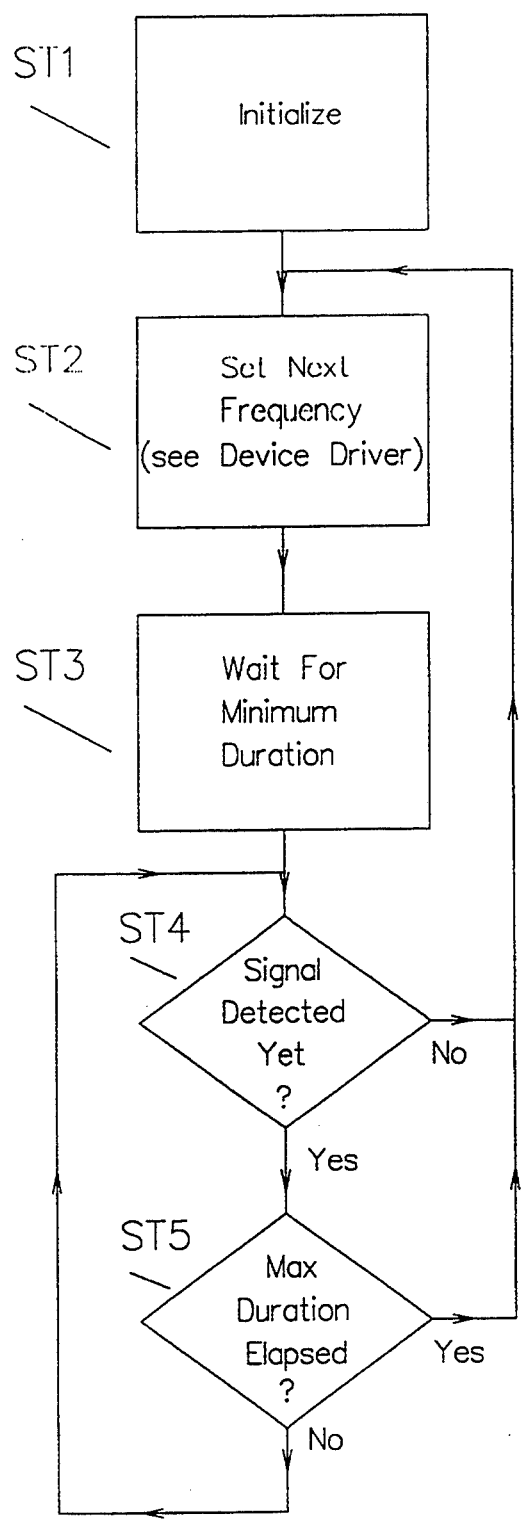
FIG. 4a is an exemplary flowchart of the main program sequence.

One advantageous use of the Machine State Virtualizer is to control frequency scanning of a radio device such as the PRO2006 scanner. A flowchart illustrating the main program sequence to perform this function is shown in FIG. 4a. ST1 is an initialization step during which rules and/or parameters are established from stored machine instructions, override rules and/or parameters are established from data files and from user input, and the Machine State Virtualizer hardware is initialized. The initialized parameters include communication parameters (frequency settletime, minimum duration, maximum duration, delay, priority frequencies, and logging mode) and device driver parameters (data output port address, control output port address, data input port address, reset instruction, latch instruction, and timing parameters).

The frequency settletime parameter causes the controlled radio device to pause for a brief period (typically around 0.050 seconds) after tuning to a frequency but before commencing other procedures. This brief pause is helpful in situations wherein the tuning circuits require time to converge to a frequency or when other delays occur. The minimum duration parameter slows down the scan speed so that frequencies are monitored for the minimum duration even if no signal is present. The default value for this parameter is zero. The maximum duration parameter limits the maximum time a particular frequency will be monitored. This parameter may be set at zero for sampling, or at 99 for an unlimited duration. The delay parameter causes scanning to pause on a frequency after completion of a reception to determine if a new signal is detected during the delay period. This is useful for monitoring two-way communications which may have periodic interruptions. The default value for this parameter is 2.0 seconds. Priority frequencies are user-designated priority channels. Lastly, logging mode refers to whether a computer record is kept of scanning activity.

The data output port address, control output port address, and data input port address are parameters relating to the connection of the external hardware of the device of the invention to the microcomputer.

The reset instruction is a command required by the Machine State Virtualizer circuitry to prepare it for the next state. It would typically instruct the device to turn all switches off and would be issued at ST6 and ST12 during the procedures described below.

The latch instruction is the means of controlling intraswitching states to maintain switch contact closure while both X and Y switches are being selected and activated and for a defined time interval. Latching may be controlled via software (e.g., constantly resending switching commands) or hardware (e.g., circuitry includes lines for latch initiation and termination). The circuit of the first preferred embodiment, shown in FIG. 2, utilizes the hardware latches contained within the microcomputer 1.

Timing parameters are intervals required by the device being controlled in order to properly receive keystrokes. Such timing parameters must be determined for each device and include minimum state time for host decoding and minimum interkey time. Such times may vary based on individual switches, sequence of strokes, the mode a machine is operating in and similar factors.

Figure 4B:
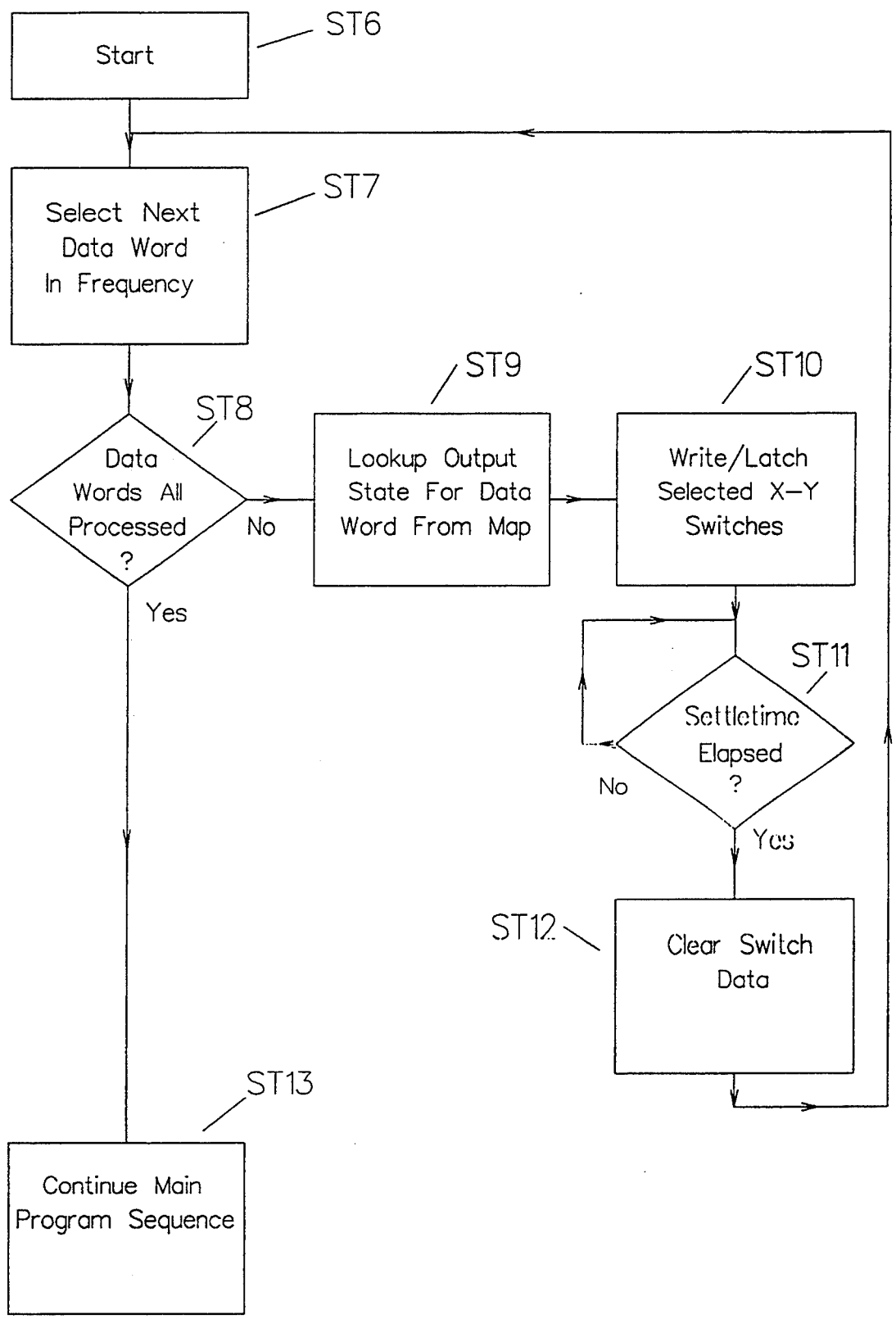
FIG. 4b is an exemplary flowchart of the device driver sequence.

Once initialization is complete, the frequency is then set in ST2. FIG. 4b is a flowchart of the device driver sequence whereby the function of setting the first or subsequent frequency (ST2) is performed for a particular device.

Referring to FIG. 4b, the device driver sequence is entered at "start" step ST6. The sequence then proceeds to select the first or subsequent data word in the frequency (ST7), and determines if all data words have been processed (ST8). If the answer in ST8 is yes, the driver returns to the main program sequence (ST13). If the answer is no, the output state for the selected data word is looked up from the map (ST9), and the output state is written and latched to the X-Y switches (ST10). The driver waits for a predetermined keystroke settletime to elapse (ST11), and then clears the switch data (ST12) and returns to ST7 to select the next data word.

Returning now to the main program sequence (FIG. 4a), the sequence waits for the minimum duration (ST3) and then determines whether a signal has been detected (ST4). The minimum duration was set to a predetermined duration during the initialization step. If a signal has not been detected, the sequence returns to ST2. If a signal has been detected, it is then determined whether the maximum duration has elapsed. The maximum duration was also set to a predetermined duration during the initialization step. If the maximum duration has elapsed, the sequence returns to ST2. If it has not, the sequence loops through states ST4 and ST5 until a signal is no longer detected or the maximum duration elapses.

When the device of the invention is used to control frequency scanning of a radio device as described above, the device of the invention provides for a plurality of user interrupt events to facilitate use thereof. User interrupts may include displaying help information, displaying the present date, modifying parameters, setting frequency exclusion rules, pausing, resuming to the next frequency, altering the display, setting frequency selection rules, editing frequency records, and ending the control sequence. In addition, the device of the invention provides a plurality of utility routines, including for example routines for building and editing frequency files, performing defined receiver operations, logging data regarding signal activity, editing parameters and rules, displaying information, and preparing reports.

It is apparent that the invention could be used to control multiple devices, or to control a larger number of switches by cascading more than one Machine State Virtualizer unit or by expanding its circuitry.

The system can also be implemented with large scale integration multiplexers such as the configuration reflected in FIG. 1b. This latter implementation actually utilizes electronic switches at each of the unique X, Y intersections rather than the X-selection to Y-selection described in the first preferred embodiment, however the functionality as it relates to the objective of the device is identical.

As previously indicated, the Machine State Virtualizer can be utilized to control any electronic device which contains switches. The description of radio scanning is presented as only one example of the applications of the device of the invention.

While there are shown and described present embodiments of the invention, it is to be distinctly understood that the invention is not limited thereto, but may be otherwise variously embodied and practiced within the scope of the following claims.

What is claimed is:

1. A universal controller for controlling an external electronic device having a switch matrix of X-lines and Y-lines, comprising:
    (A) switch means adapted to be connected to the X-lines and the Y-lines and comprising a plurality of switches for selectively interconnecting X-lines and Y-lines of the external electronic device;
    (B) control means for controlling said switch means so as to virtualize a desired machine state of the external electronic device,
        (1) wherein said control means comprises a data selector which controls said plurality of switches and storage means for storing a machine state virtualization map,
        (2) wherein said machine state virtualization map correlates X-line and Y-line intersections of said electronic device to data values corresponding to a machine state,
        (3) wherein said control means further comprises processing means for processing a control routine instruction by referencing said machine state virtualization map and outputting data values corresponding to a sequence of desired machine states to said data selector; and
    (C) feedback means for obtaining feedback from the electronic device, wherein said processing means is responsive to said feedback means, and wherein a sequence of events is altered based on preestablished rules when a predetermined signal is received from the feedback means.

2. A universal controller for controlling an external electronic device having a switch matrix of X-lines and Y-lines, comprising:
    (A) a first plurality of switches each having a first terminal adapted to be connected to the X-lines of said external electronic device and a second terminal connected to a common line;
    (B) a second plurality of switches each having a first terminal adapted to be connected to the Y-lines of said external electronic device and a second terminal connected to said common line;
    (C) control means for controlling said first plurality of switches and said second plurality of switches so as to virtualize a desired machine state of the external electronic device,
        (1) wherein said control means comprises a first data selector which controls said first plurality of switches and a second data selector which controls said second plurality of switches, and storage means for storing a machine state virtualization map,
        (2) wherein said machine state virtualization map correlates X-line and Y-line intersections of said electronic device to data values corresponding to a machine state,
        (3) wherein said control means further comprises processing means for processing a control routine instruction by referencing said machine state virtualization map and outputting data values corresponding to a sequence of desired machine states to said first data selector and said second data selector; and
    (D) feedback means for obtaining feedback from the electronic device, wherein said processing means is responsive to said feedback means, and wherein a sequence of events is altered based on preestablished rules when a predetermined signal is received from the feedback means.

3. A method of controlling an electronic device having a switch matrix of X-lines and Y-lines, comprising the steps of:
    (A) inputting information indicative of a desired machine state of the electronic device;
    (B) referencing a machine state virtualization map which correlates X-line and Y-line intersections of the electronic device to data values corresponding to machine states to determine data values corresponding to said desired machine state;
    (C) decoding said data values;
    (D) virtualizing keystrokes determinative of the desired machine state by interconnecting the X-lines and Y-lines under control of the decoded data values;
    (E) receiving feedback from the electronic device; and
    (F) altering a sequence of events when a predetermined sequence of events occurs, wherein said predetermined sequence of events is defined by a set of program rules.

* * * * *